United States Patent [19]

Bailey

[11] 4,315,161

[45] Feb. 9, 1982

[54] ELECTRIC POWER SHARING DEVICE

[76] Inventor: Kenneth A. Bailey, Box 1418, Claresholm, Alberta, Canada

[21] Appl. No.: 160,323

[22] Filed: Jun. 17, 1980

Related U.S. Application Data

[63] Continuation of Ser. No. 943,756, Sep. 19, 1978, abandoned.

[30] Foreign Application Priority Data

Sep. 19, 1977 [GB] United Kingdom ............ 38885/77

[51] Int. Cl.³ .................. H02J 3/00; H01H 3/26; H01H 37/20
[52] U.S. Cl. ...................... 307/31; 307/39; 307/41; 307/117; 307/140
[58] Field of Search ................. 307/31, 32, 39, 41, 307/42, 117, 119, 149, 140; 337/3, 13, 305, 304; 315/295, 309

[56] References Cited

U.S. PATENT DOCUMENTS 3,050,601 8/1962 Bohn .............................. 337/305 X
3,240,959 3/1966 McDonald et al. ................ 307/117

FOREIGN PATENT DOCUMENTS 1134758 11/1968 United Kingdom .

Primary Examiner—L. T. Hix
Assistant Examiner—S. D. Schreyer
Attorney, Agent, or Firm—Shlesinger, Arkwright, Garvey & Dinsmore

[57] ABSTRACT

An electrical power sharing device comprising a single power inlet feeding two power outlets alternately for periods of time as determined by the ambient temperature, the device including a bimetallic strip contacting the profile of a continuously rotating cam and opening and closing the electrical connections between the power inlet and the power outlets during each revolution of the cam for periods determined by the profile of the cam at the point contacted by the bimetallic strip as determined by the ambient temperature.

4 Claims, 10 Drawing Figures

FAR LEFT OF CENTRE

CENTRE

FAR RIGHT OF CENTRE

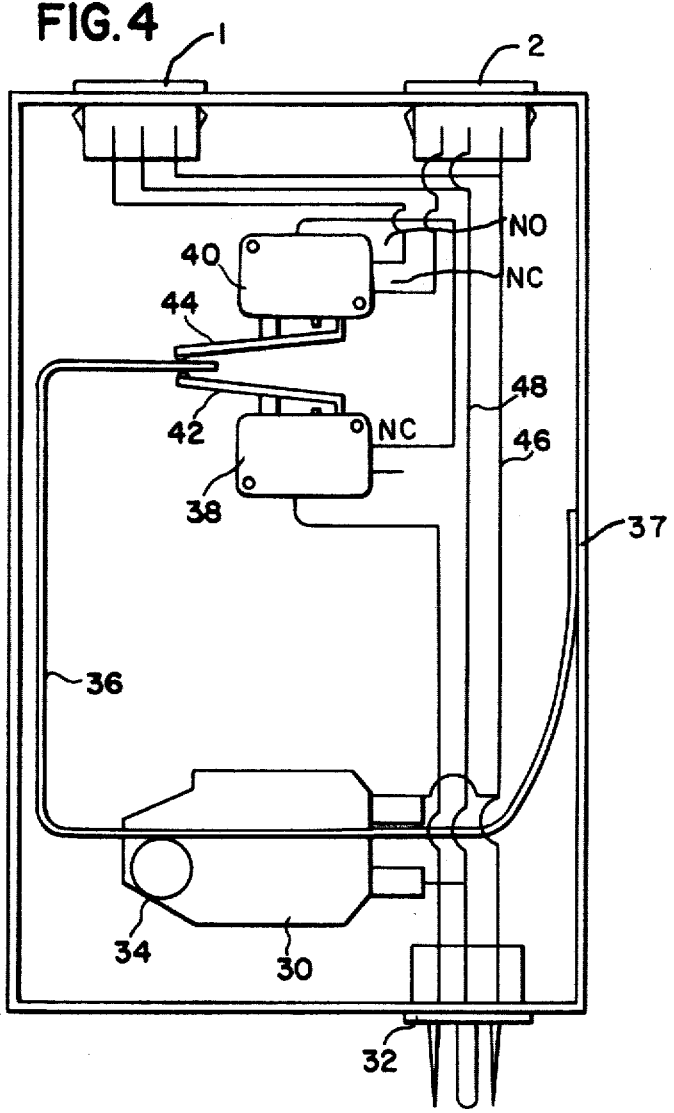
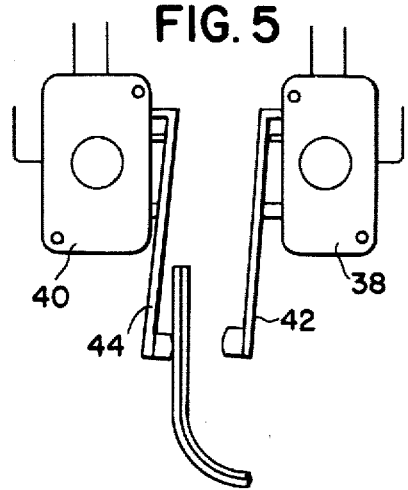
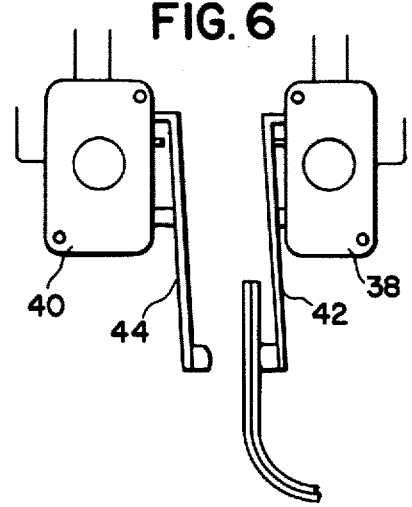
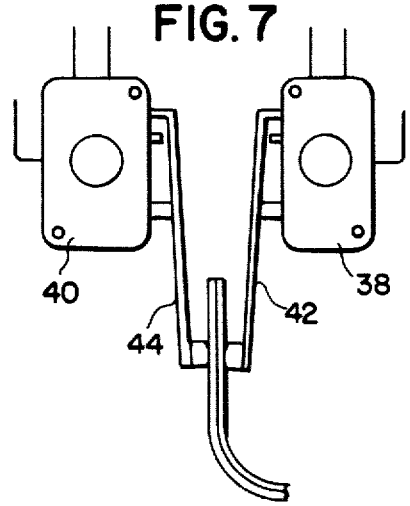

ELECTRIC POWER SHARING DEVICE

This is a continuation of application Ser. No. 943,756, filed Sept. 19, 1978, abandoned.

This invention relates to a temperature controlled device designed to prevent electrical circuit overload and additionally conserve electrical energy by controlling the alternating periods of operation of various electric loads, while gaining maximum ultization of the electrical loads by controlling their operation relative to ambient temperature.

The device according to the present invention was conceived particularly for use in motor vehicles, but it is to be understood that the invention should not be restricted to this field of application since it can be readily adapted for household or industrial usage.

BACKGROUND AND OBJECTS

According to the invention there is provided a relatively simple, economically viable device for "time sharing" a single source of electrical power between a predetermined number of loads, such as automotive heating accessories, with a view to obtaining adequate utility from each of the loads by powering each for ambient temperature-related variable time blocks, while avoiding the risk of overloading the power source, a condition which may occur should a number of accessories be in operation simultaneously.

By way of background to the subject matter of the present invention, as related to the automobile application, it is well known that certain areas of the world experience severe weather conditions for part, or all of the calendar year. A number of automotive accessories have been developed to maximize the probability of engine starting and to provide some degree of utility and comfort to the operator by heating or cooling the interior of the automobile while not in service.

Dealing firstly with the problem of starting an extremely cold engine, the most notable development includes an immersible electric coil type heater which is mounted in the engine block in such a manner so as to continually heat the engine cooling fluid and consequently the entire engine block. An engine block heated in this manner when not in operation, will start more readily in extremely cold weather due to the lower viscosity of the heated engine lubricants. Additionally, highly efficient battery chargers have been developed which ensure maximum power from the battery when starting in cold weather, recognizing that power capability of an electrical battery drops off appreciably as a function of declining temperature. Alternatively, battery heaters or "blankets" have been designed which maintain the battery temperature, and therefore power, at a high level when the automobile is not in use.

Numerous types of in-car space heaters have been designed to be accommodated within the car to provide the operator with some degree of comfort. These heaters usually consist of an electrical resistance coil to provide a heat source coupled with an air circulating fan to ensure even distribution of heated air throughout the car interior. It should be noted that this device not only provides the required comfort in very cold weather, but also either prevents a build-up of frost on the exterior of the vehicle windows, or at least eases the effort with which this frost may be removed in order to ensure adequate visibility. Finally, in climates experiencing high temperatures, independent air-conditioning equipment has also been adapted for inclusion within vehicles for the purpose of maintaining an even and bearable temperature level.

In order to power the above described electrical accessories, all of which are only operated when the vehicle itself is not in operation, it has become a practice in these geographic regions to provide an electrical power source wherever vehicles are parked for any appreciable period of time, whether at the home, office, factory, or even public parking lots. In an increasing number of cases, these electrical power sources occur with a number of power plugs wired in parallel, thus limiting the electrical load that should be placed on any one power plug. For example, in a public parking lot, it is general to find four plugs wired in parallel to a thirty-five amp main circuit breaker, thus limiting the average maximum load on each of the five plugs to 8.75 amps. Considering the power requirements of various automotive electrical accessories described heretofore, it is obvious that the combined series of plugs could be automatically tripped-out should a number of the plugs be subject to a load exceeding 9 amps, such that the total load at a main breaker exceeds 35 amps. To illustrate the problem further, a conventional automotive block heater of the immersion coil type, uses 600 watts of power, which at 110 volts draws current at the rate of 5.5 amps. An in-car heater typically uses 850 watts of power, causing a 7.72 amp draw at 110 volts. Therefore, it is common to note signs in parking lots warning the operator that the electric circuits are designed to power only engine block heaters, and that in-car heaters are not to be operated in addition to the engine heaters under any conditions, for fear of overloading the entire circuit and causing a great deal of inconvenience to other operators.

Particularly recognizing the above mentioned limitations of outdoor electrical parking facilities, on the one hand and the ever present desire of an operator to install and operate electrical automotive accessories which either improve the cold weather starting capability of the engine or provide some degree of creature comfort, it is the essence of this invention that means be provided whereby utility, comfort, and the power draw limitations of individual car plugs are automatically balanced so that each requirement or limitation is satisfied to a reasonable degree.

From one aspect the invention provides an electrical power sharing device comprising a single power inlet feeding two power outlets alternately for periods of time determined by the ambient temperature, said device comprising a bimetallic strip contacting the profile of a continuously rotating cam and opening and closing the electrical connections between the power inlet and the power outlets during each revolution of the cam for periods determined by the profile of the cam and the curvature of the bimetallic strip as determined by the ambient temperature.

From another aspect, the invention provides an electrical power sharing device comprising a single power inlet and two power outlets, a cam rotated continuously while power is supplied to said inlet, and a temperature responsive device including a part contacting the profile of said cam and an electrical contact adapted to contact one or the other of two contact members to connect said power inlet alternately to one or the other of said outlets, the profile of said cam being such that one of said contacts is closed for part of each revolution of the cam whilst the other is closed during the remaining part of such revolution, the ratio of said parts being determined by the position of said temperature responsive device in relation to the cam.

From yet another aspect, the invention provides an electrical power sharing device comprising a single power inlet and two power outlets, a cam rotated continuously while power is supplied to said inlet, the cam being mounted eccentrically to provide maximum and minimum lifts for a cam follower during varying proportions of a revolution of the cam. The cam follower includes a metallic strip, an electrical contact carried by said bimetallic strip connecting one of said outlets to the inlet during the period of maximum lift and the other of said outlets during the period of minimum lift.

In this age of increasing awareness of the necessity to conserve power, the present invention has the added advantage of providing a means of powering more than one electrical load, while causing only a marginal increase in the power consumption incurred when powering only one such load.

For example if a 600 watt block heater is powered 100% of the time, an average power draw of 5.5 amps occurs. However, with the proposed power sharing device described herein, the power is cycled from one circuit to the other, dependent upon ambient temperature so that, for example, at −6° C. the present invention automatically powers the block heater 60% of the time (with a power draw of 5.5 amps), and an 850 watt in-car heater 40% of the time (with a power draw of 7.72 amps), resulting in an average power draw of only 6.38 amps.

Further, overall power consumption can be reduced by incorporating a means of shutting power off to both output plugs above a giver temperature.

In essence, the electrical power sharing device to be described in more detail hereinafter, accomplishes in a simple and economic manner, the "sharing" of one power source alternately to each of the two output power plugs incorporated into the same apparatus, said sharing to be automatic and proportionate to the ambient temperature in the cabin of the automobile.

The variability of the time "on" and "off" ranges within an approximate 12–15 minute time cycle, resulting from the incorporation into the apparatus of a bimetallic "temperature sensitive" element running on an eccentrically mounted cam in such a manner that the automobile heating accessories most important to the starting of an engine in extremely cold weather are powered 100% of the cycle (that it, continuously) as the temperature in the cabin of the automobile drops below −10° C. (signifying a drop in outside temperature). As the cabin temperature will normally be comfortable, and the engine block hot when the unit is first plugged in, it is advantageous to design the bimetallic contact arm/cam shaft combination in such a manner that the in-car heater is powered only as the cabin temperature drops below +5° C.

In the preferred embodiment shown in the drawings and described hereinafter, the device is designed for the distribution of the main voltage (eg 100 v or 250 v) power source in the time percentage ranges shown in Table 1:

TABLE 1

| Temp | −10° C. or below | −7 | −5 | −3 | 0° C. | +1 | +2 | +3 | +4 | +5° C. and above |
|---|---|---|---|---|---|---|---|---|---|---|
| Plug 1 On % | 100% | 70% | 50% | 30% | 0% | 0% | 0% | 0% | 0% | 0% |
| Plug 2 On % | 0% | 30% | 50% | 70% | 100% | 80% | 60% | 40% | 20% | 0% |

The preferred grouping of the automotive accessories would be:

| | |
|---|---|
| On Plug #1: | (a) an automotive engine block heater or ram pump OR |
| | (a) an automotive engine block heater or ram pump in conjuntion with either: |
| | (b) a light duty battery charger OR |
| | (c) an electric battery blanket (heater) |
| On Plug #2: | (d) an in-car space heater commonly utilizing an electric heating coil and an electric circulating fan. |

In sharing, or cycling the input power to each of the two groups of electrical accessories described above, it is specifically claimed that an appreciable and beneficial portion of the ultimate utility of each of the driven accessories is achieved while ensuring that the source power circuit is not overloaded and subsequently "tripped" out. This high degree of utility is achieved by virtue of the fact that in the case of accessory (a), the block heater, accessory (c) the battery blanket and accessory (d), the in-car heater, the mass of the engine block, the engine coolant, the battery, the air and interior components of the automobile all act as "heat sinks" to varying degrees, and therefore store and evenly distribute the input energy (i.e. heat), in such a manner as to accomplish a respectable and adequate utility of each of the accessories.

The specific object of not exceeding the recommended load for a specific plug in a parking area where a number of car plugs are wired in parallel (with a limiting amperage rating of for example, 8 to 10 amps per plug) is accomplished by limiting the total amperage draw on each of the output plugs of the device, by grouping the powered accessories in such a manner that their combined amperage draw does not exceed the limit of the specific parking lot plug, and by ensuring that only one plug of the device (and therefore only one grouping of accessories) is powered at any one coment in time.

To further illustrate this feature, the following typical combination of accessories is exemplified:

Output Plug No. 1: —powering the following:
(a) engine block heater 600 watts—5.5 amps
(b) battery charger—ranging from 4 amps maximum loading on a dead battery to 0.8 amps on a charged battery and assuming an average draw of 1.2 amps on a normal in-service battery.

Output Plug No. 2: —powering the following:
(a) an in-car heater—850 watts—7.72 amps Under these accessory combinations, output Plug No. 1 will draw an average of 6.7 amps while output plug No. 2 will draw 7.72 amps, thus ensuring that the input power source is never overloaded and the probability of an automatic electrical "trip-out" of a group of parking plugs is minimized.

It therefore naturally follows that while achieving a good portion of the ultimate utility of the various accessories, the total power consumption is appreciably reduced. That is, taking the above example of accessories (a), (b), and (d), if all were powered simultaneously, a total amperage draw of $6.7 + 7/72 = 14.42$ amps would result. By utilizing the invention, at for example an automobile interior temperature of approximately $-6°$ C., whereby accessories (a) and (b) would be powered for 60% of the cam cycle, then accessory (d) would be powered for 40% of the cam cycle, average amperage draw of $(6.7 + 0.6) + (7.72 + 4) = 7.10$ amps would result, thus halving the power consumption with only marginal loss of utility.

DESCRIPTION OF THE DRAWINGS

The invention will be further described with reference to accompanying drawings in which:

FIG. 4 is a schematic illustration of another embodiment of the invention; and

FIGS. 5–7 are schematic views illustrating the operation of the embodiment of FIG. 4.

DESCRIPTION OF THE EMBODIMENT OF FIGS 1–3

Figure 3:
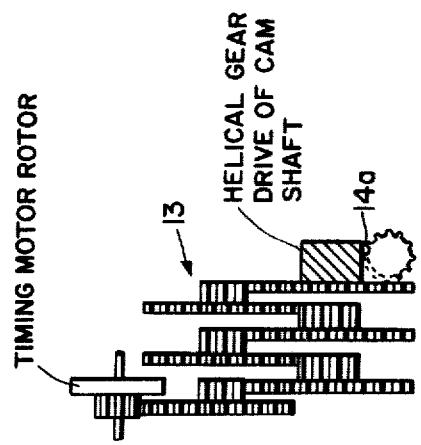
FIG. 3 is a side elevation view of the gearing system.
Figure 2:
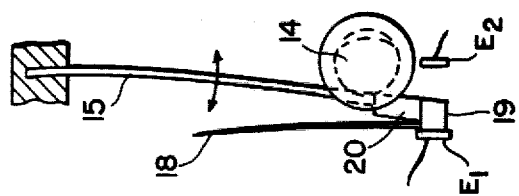
FIG. 2 is a detailed view showing the cam and bimetallic cam follower.

The apparatus 10, as mentioned previously, would be mounted in a convenient location in the interior cab of the automobile. The male power-in plug 11 on the apparatus is connected to an outdoor parking plug (not shown) by conventional means such as an extension cord.

The electrical power input source is then utilized to power both the fractional horse-power timing motor 12, and one of the two female output power plugs numbered 1 and 2 respectively, in temperature related variable time blocks as detailed below.

Power drawn into the fractional horse-power timing motor 12 causes it to rotate at 1800 RPM when connected for example to a 100 volt, 60 cycle AC circuit. The rotational speed of the timing motor 12 is reduced by means of a gear reduction cluster 13 to a helical gear 14a, which in turn drives the final cam-shaft 14 at a speed of 1 revolution per cycle e.g. one revolution per 15 minutes. The cam-shaft 14 has a profile which varies from round at each end graduated to a flattened circular section in the centre. This cam-shaft in turn contacts the underside of the bimetallic bar 15.

Figure 1A:
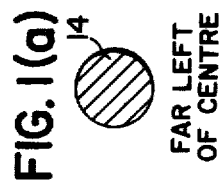
FIGS. 1(a), 1(b), and 1(c) show the variation in profile along the axis of the cam-shaft.
Figure 1B:
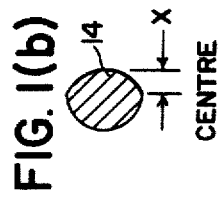
Figure 1C:
Figure 1:
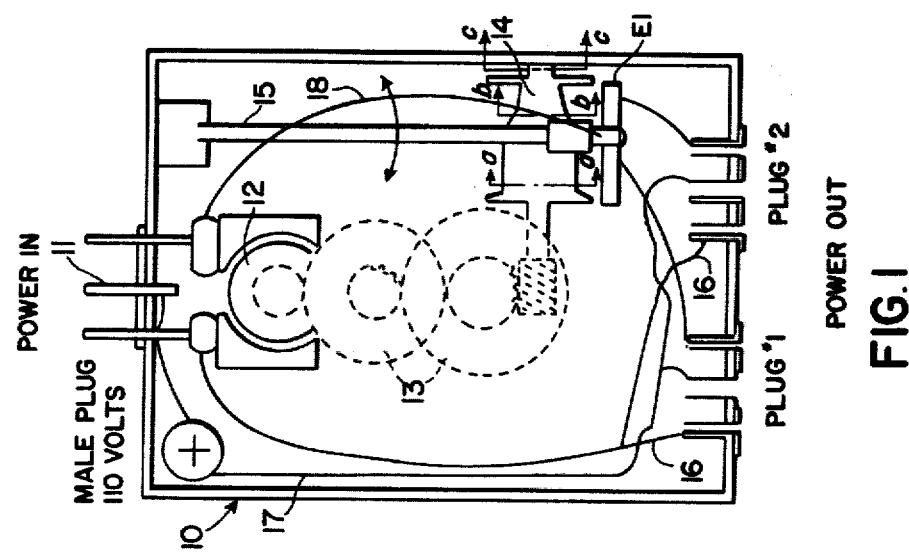
FIG. 1 is a general plan view of the invention showing the relationship of the major parts of one embodiment.

The bimetallic bar 15 is of such design that it will pull to the extreme left or right side of the cam-shaft 14 as viewed in FIG. 1 when the automobile cabin temperature is either greater than 40° F. or less than 15° F. respectively. In the case of the lower cabin temperature, this causes contact $E_1$ to be closed for the entire cycle. In the case of cabin temperature greater than 60° F. the bimetallic strip runs on a portion of the cam with a profile such that neither contact $E_1$ or $E_2$ is closed. When the cabin temperature is in the 15° F. to 40° F. range, the bimetallic bar 15 will be in the centre range of the cam-shaft 14, where the cam profile is such that $E_1$ would be closed in a range of from 60% to 100% of the 15 minute time cycle, and contact $E_2$ would be closed in a range of 0% to 40% of the 15 minute time cycle.

In this manner, power flows to output plug No. 1 for a period ranging from 9 to 15 minutes of the 15 minute cycle, and then to output Plug No. 2 for 6 to 0 minutes of the time cycle according to the car cabin temperatures.

The neutral leg of the circuit from each output plug is connected permanently to the same pole of the power-in plug 11 via wire 16. The apparatus itself and the automotive accessories are grounded via wire 17.

It is important to appreciate that the bimetallic bar 15 does not carry the input power to contact $E_1$ and $E_2$ but that this is achieved by means of a flexible wire 18 running from the input power plug 11 to a contact 19 at the tip of the bimetallic bar 15, the contact 19 being isolated from the bar by an insulator 20.

The electrical design of the apparatus according to this embodiment is such that it will carry a load of 1440 watts and 12 amps, and the automotive accessories powered by the apparatus would be grouped on output plugs No. 1 and No. 2 in such a manner as to balance the load and remain within the load limitations of the circuit which carries the parking plugs. As this is generally in the 7 to 10 amperage range, instructions regarding the recommended combination of accessories would be printed on the case of the apparatus.

DESCRIPTION OF THE EMBODIMENT OF FIGS. 4–7

In the embodiment of FIGS. 4–7, a synchronous motor 30 is driven by power supplied from the inlet power source at plug 32. A gear train such as that illustrated at 13 of FIG. 3 is used through which the cam 34 is driven at a speed of approximately 1 revolution per cycle or approximately 1 revolution for every 12–15 minutes. A bimetallic cam follower arm 36 is attached to the housing for example at 37 and has its distal end curved in the manner shown in FIG. 4.

The distal end of the bimetallic cam follower arm 36 is positioned between two opposed microswitches 38 and 40 so that movement of the follower 36 upwardly or downwardly as viewed in FIG. 4 will cause actuation of one or the other of the switches 38 and 40.

The bimetallic cam follower 36 is of such a composition that the actuator tends to coil inwardly under increasing ambient temperature while expanding outwardly as the ambient temperature drops, according to this embodiment. The temperature related action of the actuator 36 thus has the effect of changing the neutral point of the travel of the actuator tip such that the neutral point is either closer to the microswitch 38 as the temperature rises, or further away from the microswitch 38 as the ambient temperature drops.

The circuitry is arranged such that power will only flow from the input power plug 32 through the microswitch 38 to the microswitch 40 when the trip arm 42 of the microswitch 38 is in its normal, spring loaded extended position as shown in FIGS. 4, 5, and 7.

At an ambient temperature of approximately 0° C., the positioning of the bimetallic actuator and the action of the rotating eccentric wheel 34 are such that the line power is allowed to flow constantly through microswitch 38 to microswitch 40, and the action of the actuator on arm 36 is such as to feed the power to output plug 1 for 100% of the cam cycle.

Should the ambient temperature rise above 0° C., the bimetallic actuator 36 coils inwardly thus shifting the neutral position of the actuator closer to the microswitch 38 and thereby causing power flow through microswitch 38 to be interrupted for a portion of the cam cycle, thus resulting in interruption of the power flow to plug 1 and diversion of the power to plug 2. As the ambient temperature increases, the neutral point of the actuator moves even closer to the microswitch 38 causing the power flow to plug 1 to be interrupted for an even greater portion of the cam cycle. This relationship continues proportionately until an ambient temperature of about 5° C. is reached, at which time the trip arm 42 of the microswitch 38 is depressed 100% of the cam cycle shutting off all power flow to the outlet plugs.

Likewise, as the ambient temperature drops below 0° C., the bimetallic actuator 36 coils outwardly thus shifting the neutral axis of the distal end away from the microswitch 38 allowing a constant flow of power to microswitch 40. At a temperature between 0° C. and −10° C., the combined movement of the eccentric cam 34 and the extended actuator cause the trip arm 44 of the microswitch 40 to be periodically depressed beyond its horizontal trip point, thereby causing the power flow to be alternated between outlet plug 1 and 2. Thus, according to the ambient temperature within the automobile, current will be supplied to power both the engine heater and the passenger compartment or just the engine heater, as may be required.

The neutral leg of the circuit from each output plug is connected permanently to the same pole of the power inlet plug 32 by means of wire 46, and the apparatus itself and the automotive accessories are grounded via wire 48.

The electric design of the apparatus according to this embodiment is such that it will carry a maximum load of 1650 watts and 15 amps in accordance with electrical code requirements, and the automotive accessories powered by the apparatus would be grouped on output plugs 1 and 2 in such a way as to balance the load and remain within the load limitations of the circuit which carries the parking lot plugs.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A timed electrical power sharing device for distributing electric power to either of two loads comprising:
    a single electrical power inlet and two electrical power outlets fed alternately by said power inlet for variable portions of a cycle,
    first and second switch means having actuator elements and connecting said power inlet and said power outlets,
    said first switch means being in series with said second switch means so as to permit the flow of electricity to said second switch means in a first position and interrupt the flow of electricity to said second switch means in a second position,
    said second switch means directing the flow of electricity to one of said outlets when in a first position and the other of said outlets when in a second position,
    said first and second switch means being positioned in opposed relationship,
    a common actuator member for said first and second switch means actuator element comprising a thermally responsive bimetallic arm positioned between said first and second switch means and engageable with said actuator elements,
    a continuously rotating cam engaging said bimetallic arm for changing the position of said bimetallic arm relative to said actuator elements during said variable portions of a cycle,
    whereby the ambient temperature determines the configuration of said arm member and thereby determines the proportional actuation of said first and second switch means for diversion of power to said power outlets during a cycle of said cam as a function of the ambient temperature.

2. A device as in claim 1 and wherein said bimetallic arm has a configuration such that at a temperature of about 5° C. or above said bimetallic arm opens first switch means during the complete cycle of rotation of said cam so that no electrical power flows to said outlets during said cycle.

3. A device as in claim 2 and wherein said power inlet and said power outlets have common neutral and ground lines.

4. An electrical power sharing device comprising:
    a single electrical power inlet and two electrical power outlets fed alternately by said power inlet for portions of a cycle,
    a continuously rotating cam,
    switching means for conducting electricity from said power inlet to one of said power outlets,
    a cam follower comprising a bimetallic temperature responsive arm member for actuating said switching means, said arm member having a first portion contacting the profile of said cam and a second portion having an electrical contact electrically insulated from said arm member moveable between first and second contacts associated with said power outlets whereby electricity is conducted to one or the other of said outlets from said electrical contact on said second portion of said arm,
    the profile of said cam varying longitudinally continuously from a circular section to a flattened circular section whereby one of said outlets is connected to said inlet during a whole revolution of said cam when said first portion contacts said circular section and the circular portion of said flattened circular section, and the other of said outlets is connected to said inlet while said first portion contacts the flat portion of said flattened circular section,
    whereby the ambient temperature determines the configuration of said arm member and thereby determines the period of actuation of said switching means for diversion of power to one of said outlets during a cycle of said cam as a function of the ambient temperature.

* * * * *